(12) United States Patent
Rossi et al.

(10) Patent No.: US 10,772,389 B2
(45) Date of Patent: Sep. 15, 2020

(54) QUICK FIT TANK CINCH

(71) Applicants: Jacopo Rossi, Genoa (IT); Corrado Cominetti, Genoa (IT); Bradley E. Lally, San Diego, CA (US)

(72) Inventors: Jacopo Rossi, Genoa (IT); Corrado Cominetti, Genoa (IT); Bradley E. Lally, San Diego, CA (US)

(73) Assignee: Johnson Outdoors Inc., Racine, WI (US)

( * ) Notice: Subject to any disclaimer, the term of this patent is extended or adjusted under 35 U.S.C. 154(b) by 292 days.

(21) Appl. No.: 15/706,042

(22) Filed: Sep. 15, 2017

(65) Prior Publication Data

US 2019/0082795 A1 Mar. 21, 2019

(51) Int. Cl.
   *A44B 11/12* (2006.01)
   *B63C 11/08* (2006.01)
   (Continued)

(52) U.S. Cl.
   CPC ............ *A44B 11/125* (2013.01); *B63C 11/08* (2013.01); *F16B 2/08* (2013.01); *B63C 11/22* (2013.01); *B63C 2011/2281* (2013.01)

(58) Field of Classification Search
   CPC . B63C 2011/2281; B63C 11/08; B63C 11/22; A44B 11/065; A44B 11/125; A44B 11/04; F16B 2/08
   (Continued)

(56) References Cited

U.S. PATENT DOCUMENTS

| 3,033,431 A | 5/1962 | Henderson |
| 3,957,183 A | 5/1976 | Gadberry |

(Continued)

FOREIGN PATENT DOCUMENTS

| EP | 0 215 704 A1 | 3/1987 |
| JP | 02-025389 U | 2/1990 |
| JP | 08-258788 A | 10/1996 |

OTHER PUBLICATIONS

Halcyon traveler bc system | diving-diveinstinct.com; 3 pages printed from the internet; date last visited Mar. 7, 2015; http://diveinstinct.com/halcyon-traveler-bc-system-1042.

(Continued)

*Primary Examiner* — Benjamin F Fiorello
*Assistant Examiner* — Stacy N Lawson
(74) *Attorney, Agent, or Firm* — Reinhart Boerner Van Deuren P.C.

(57) ABSTRACT

A tank cinch is configured to cooperate with a strap to secure a tank of compressed air to a buoyancy compensation device. The tank cinch includes an adjustable frame having a sliding member, a first cam receiver and a second cam receiver. A lever body including a first cam and a second cam is pivotably joined to the adjustable frame and is pivotable about a pivoting axis defined by the adjustable frame. The lever body is configured to fix a first end portion of the strap. The adjustable frame is configured to fix a second end portion of the strap with the sliding member when the lever is rotated about the pivoting axis towards the adjustable frame member. The cams are arranged to bear against an outermost surface of the tank and to be received in the cam receivers when the lever body is pivoted towards the adjustable frame.

19 Claims, 6 Drawing Sheets

(51) Int. Cl.
*F16B 2/08* (2006.01)
*B63C 11/22* (2006.01)

(58) Field of Classification Search
USPC ........ 405/186; 24/69 R, 69 ST, 69 TS, 71 R, 24/71 ST, 197, 171, 193, 196, 198, 200
See application file for complete search history.

(56) References Cited

U.S. PATENT DOCUMENTS

| | | | |
|---|---|---|---|
| 4,310,110 A | | 1/1982 | Dexter |
| 4,389,756 A | * | 6/1983 | Kasama ................ A44B 11/10 24/171 |
| 4,528,700 A | * | 7/1985 | Johnston ................ A41F 9/002 2/338 |
| 4,690,314 A | | 9/1987 | Faulconer et al. |
| 4,777,703 A | * | 10/1988 | Knox ................ A44B 11/125 24/170 |
| 4,778,307 A | | 10/1988 | Faulconer |
| 4,796,336 A | * | 1/1989 | Scully ................ A44B 11/125 24/196 |
| 4,918,790 A | * | 4/1990 | Cirket ................ A44B 11/006 24/442 |
| 5,046,894 A | | 9/1991 | Bergstrom |
| 5,346,419 A | | 9/1994 | Kaiser |
| 5,378,084 A | | 1/1995 | Walters et al. |
| 5,567,084 A | | 10/1996 | Oliver |
| 5,626,439 A | | 5/1997 | Rowlands |
| 5,662,433 A | | 9/1997 | Seligman |
| 6,402,429 B1 | | 6/2002 | James |
| 6,409,429 B1 | | 6/2002 | Belloni |
| 6,503,114 B2 | | 1/2003 | Kawashima et al. |
| 6,749,370 B1 | | 6/2004 | Urabe et al. |
| 6,805,519 B1 | | 10/2004 | Courtney |
| 7,001,107 B2 | | 2/2006 | Matsuoka |
| 7,052,211 B1 | | 5/2006 | Curry |
| 7,367,749 B2 | | 5/2008 | Kim |
| 7,540,690 B2 | | 6/2009 | Garcia et al. |
| 8,006,877 B2 | | 8/2011 | Lowry et al. |
| 8,398,337 B2 | | 3/2013 | Jablonski |
| 2002/0111096 A1 | * | 8/2002 | Kawashima ......... A44B 11/125 441/116 |
| 2006/0032028 A1 | * | 2/2006 | Takeuchi ............... A44B 11/04 24/197 |
| 2006/0175492 A1 | | 8/2006 | Cooper |
| 2009/0178256 A1 | | 7/2009 | Toth |
| 2010/0000061 A1 | * | 1/2010 | Gopal ................ A44B 11/125 24/68 CD |
| 2010/0282793 A1 | | 11/2010 | Wrigley et al. |
| 2011/0197406 A1 | | 8/2011 | Couzyn |
| 2015/0144674 A1 | | 5/2015 | Losos et al. |

OTHER PUBLICATIONS

Halycon Cinch Quick—Adjust Harness Upgrade; 3 pages printed from the internet; date last visited Mar. 7, 2015; http://add-helium.shoplightspeed.com/halcyon-halcyon-standard-cinch-quick-adjust-harnes.html.

U.S. Appl. No. 16/137,188, filed Sep. 20, 2018, Stella et al.

* cited by examiner

QUICK FIT TANK CINCH

FIELD OF THE INVENTION

This invention generally relates to diving gear and more particularly to tank cinches for strapping down a breathing gas tank.

BACKGROUND OF THE INVENTION

Scuba diving is a growing recreational sport as well as a professional activity for diverse groups such as emergency responders and military divers. In scuba diving, a diver uses a self-contained underwater breathing apparatus (scuba). Typically, scuba divers carry their own source of breathing gas, usually in a cylindrical tank, as part of their scuba gear. The tank is carried by the diver with the help of a buoyancy compensator, referred to as a BC. BC's may be a vest or back pack worn by the diver. The BC utilizes a strap, belt or webbing to secure the tank to the BC.

Securing the tank to the BC is important in scuba diving. If the tank is not tightly connected to the BC then it can shift in position during the dive which could result in separation of the tank from the conduit supplying air to the diver. Further, if the connection of the tank to the BC is too loose or improperly done, the tank could separate from the BC which means it could fall off the diver. Such a fall, could prevent air from reaching the diver.

Unfortunately, prior art cinch designs are complex, costly to manufacture and for divers not properly trained, hard to understand how to use. In other words, because the cinches of prior art designs are hard to understand and use, then divers are at risk of improperly securing their tanks to their BC's, which in turn could lead to the risks discussed above during a dive. Further, because such prior designs are complex, then training and refresher training can be time consuming which is particularly troublesome for recreational divers with limited time to dive.

BRIEF SUMMARY OF THE INVENTION

In one aspect, an embodiment of the invention provides a tank cinch configured to cooperate with a strap to secure a tank of compressed air to a buoyancy compensation device. The tank cinch includes an adjustable frame having a sliding member, a first cam receiver and a second cam receiver. A lever body is pivotably joined to the adjustable frame. The lever body is pivotable about a pivoting axis defined by the adjustable frame. The lever body has a first cam and a second cam. The lever body is configured to fix a first end portion of the strap and the adjustable frame is configured to fix a second end portion of the strap with the sliding member when the lever is rotated about the pivoting axis towards the adjustable frame member. The first and second cam are arranged to bear against an outermost surface of the tank and to be received, respectively, in the first and second cam receivers when the lever body is pivoted towards the adjustable frame.

In another aspect, an embodiment of the invention provides a tank cinch configured to cooperate with a strap to secure a tank of compressed air to a buoyancy compensation device for a diver. The tank cinch includes an adjustable frame having a sliding member. An end of the adjustable frame and the sliding member define a first adjustable channel. The tank cinch includes a lever body. The lever body has a strap post arranged for fixing a first end portion of the strap. The lever body is pivotably joined to the adjustable frame. The sliding member and strap post define a second adjustable channel which is arranged to receive a second end portion of the strap.

In yet another aspect, an embodiment of the invention provides a buoyancy compensation device configured to secure a tank of compressed air. The buoyancy compensation device includes a buoyancy compensation body configured to be worn by a diver and a strap arranged to secure the tank of compressed air to the buoyancy compensation body. The tank cinch includes an adjustable frame having a sliding member. The tank cinch also includes a lever body pivotably joined to the adjustable frame. The lever body is pivotable about a pivoting axis defined by the adjustable frame. The lever is configured to fix a first end portion of the strap and the adjustable frame is configured to fix a second end portion of the strap with the sliding member when the lever is rotated about the pivoting axis towards the adjustable frame member.

In an embodiment, an outermost perimeter of the lever body may be defined by a handle and a fixed strap post. The fixed strap post may be approximately parallel to and in opposed space relation to the handle. A first rocker arm may connect the handle and the strap post. A second rocker arm may be approximately parallel to and in an opposed space relation to the first rocker arm. The second rocker arm may connect the handle and the strap post.

In another embodiment, the first rocker arm may include the first cam and the second rocker arm may include the second cam.

In an embodiment, the first cam and the second cam may each define a respective aperture. Each respective aperture may receive a respective leg of the adjustable frame.

In yet another embodiment, the adjustable frame may include a first member separated from a second member by a third member transverse to the first and second members. The adjustable frame may also include a sliding member that defines a first slot and a second slot configured to receive the first member and second member respectively therethrough.

In still another embodiment, the first member may define a first straight portion and the first cam receiver and the second member may define a second straight portion and the second cam receiver.

In an embodiment, the third member may define a first stop for the sliding member and the first cam receiving portion and second cam receiving portion may define a second stop for the sliding member.

In another embodiment, the sliding member slides along the first and second straight portions between the first and second stops.

In another embodiment, the first cam receiver may be defined by a first leg, a second leg and a third leg and the second cam receiver may be defined by a second first leg, a second second leg and a second third leg.

In still another embodiment, the third leg and second third leg are received into a first cam aperture and a second cam aperture respectively of the first and second rocker arms to define the pivoting axis.

In an embodiment, the first adjustable channel receives the second end portion of the strap and is configured to provide a first tensioning force to the strap when the second end portion of the strap passes over the sliding member and into the first channel.

In another embodiment, a pivoting axis may be defined by a second end portion of the adjustable frame.

In an embodiment, the lever body may provide a second tensioning force to the strap when the lever body is rotated towards the adjustable frame. The second tensioning force may lock the lever into a fixed position.

In still another embodiment, the lever body may define a first and second cam. The first and second cams may be received, respectively, into a first cam receiver and a second cam receiver defined by the adjustable frame.

In another embodiment, the lever body may define a handle at its outermost perimeter and the strap post may be located between the sliding member and the handle.

In an embodiment, the adjustable frame may include a first member at its outermost perimeter in opposed space relation and approximately parallel with the handle. The sliding member may be located between the first member and the strap post.

In still another embodiment, the adjustable frame may include a first member separated from a second member by a third member transverse to the first and second members. It may further include a sliding member defining a first slot and a second slot configured to receive the first member and second member respectively therethrough.

In yet another embodiment, the first member may define a first straight portion and a first cam receiver and the second member may define a second straight portion and a second cam receiver.

Other aspects, objectives and advantages of embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of embodiments of the present invention and, together with the description, serve to explain the principles of the invention. In the drawings.

While embodiments of the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the invention provide an intuitively simple to use tank cinch that is structurally configured for quick tensioning of a strap that secures a tank to a buoyancy compensator, also referred to as a BC. These and other advantages of the invention, as well as additional inventive features, will be apparent from the description of the invention provided herein.

Figure 1:
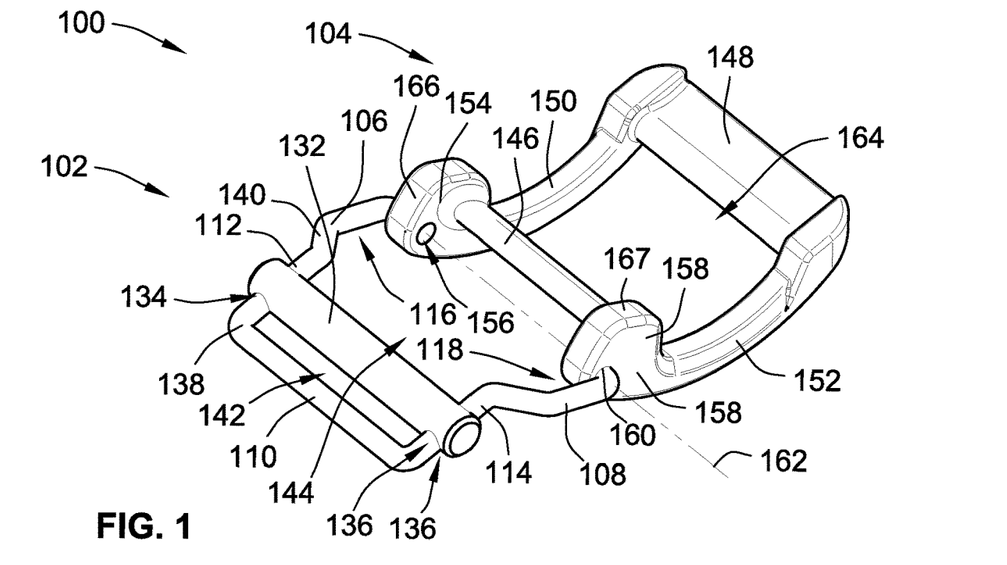
FIG. 1 illustrates a plan view of a tank cinch in the open position according to the teachings of embodiments of the present invention.

FIG. 1 illustrates a tank cinch 100 according to the teachings of embodiments of the instant invention. The tank cinch 100 is made up of an adjustable frame 102 pivotably joined to a lever body 104. An outermost perimeter of the adjustable frame 102 is defined by a first member 106 separated from a second member 108 by a third member 110 that extends transverse to the first and second members 106, 108. The first member 106 includes a first straight portion 112 and the second member includes a second straight portion 114. The first member 106 defines a first cam receiver 116 and the second member 108 defines a second cam receiver 118. First cam receiver 116 receives a first cam 154 and second cam receiver 118 receives second cam 158.

Figure 2:
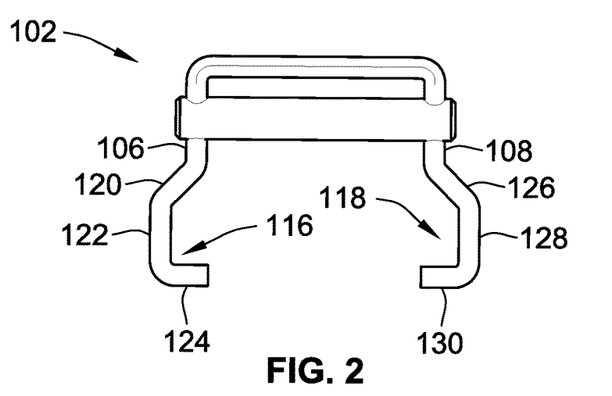
FIG. 2 illustrates a plan view of an adjustable frame of the tank cinch of FIG. 1.

FIG. 2 illustrates that the first cam receiver 116 is defined by a first leg 120, a second leg 122 and a third leg 124. The second cam receiver 118 is defined by a second first leg 126, a second second leg 128 and a second third leg 130.

Turning back to FIG. 1, the adjustable frame 102 further includes a sliding member 132. Sliding member 132 defines a first slot 134 and a second slot 136. The first slot 134 receives the first member 106 of the adjustable frame while the second slot 136 receives the second member 108 of the adjustable frame 102. The sliding member 132 is slidable between a first stop 138 defined by the third member 110 of the adjustable frame 102 and a second stop 140 defined by the intersection of the first leg 120 (FIG. 2), and the first straight portion 112 and the intersection of the second straight portion 114 and the second first leg 126 (FIG. 2).

A first adjustable channel 142 of adjustable frame 102 is defined between sliding member 132 and the third member 110. A second adjustable channel 144 is defined between the sliding member 132 and a strap post 146 of the lever body 104.

Lever body 104 has an outermost perimeter defined by a handle 148, the strap post 146, a first rocker arm 150 and a second rocker arm 152. The strap post 146 and the handle 148 are in opposed spaced relation and approximately parallel to one another. By approximately it is meant within 5° of parallel. The strap post 146 and the handle 148 are fixed in place between the first rocker arm 150 and the second rocker arm 152. The first rocker arm 150 and the second rocker arm 152 are in opposed spaced relation and approximately parallel to one another.

Figure 3:
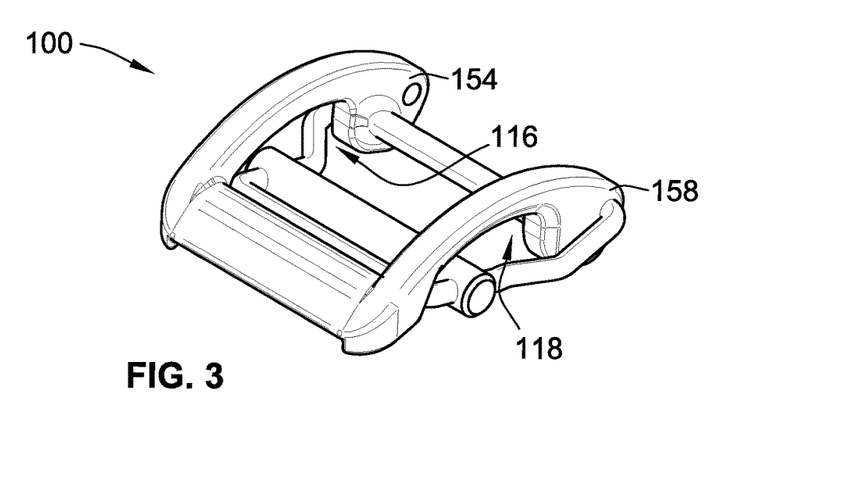
FIG. 3 illustrates a plan view of the tank cinch of FIG. 1 in the closed position.

First rocker arm 150 defines a first cam 154. The first cam 154 defines a first cam aperture 156 that receives the third leg 124 (FIG. 2) of the adjustable frame 102. Second rocker arm 152 defines second cam 158 that defines second cam aperture 160 that receives the second third leg 130 (FIG. 2) of the adjustable frame 102. A pivot axis 162 is defined by the first cam aperture 156 and the second cam aperture 160. The lever body 104 pivots about the pivot axis 162 as the handle 148 is rotated about the pivot axis 162 towards the adjustable frame 102. It may now be readily appreciated that FIG. 1 illustrates the tank cinch 100 in an open position. FIG. 3 illustrates the tank cinch 100 in a closed position.

Turning back to FIG. 1, lever body 104 defines a lever body channel 164 between the handle 148 and the strap post 146. The dimensions of the lever body channel 164 are fixed, that is, the length and the width of the channel 164 do not change because the handle 148 and the strap post 146, as previously discussed, are fixed in position between the first rocker arm 150 and second rocker arm 152. First rocker arm 150 defines a curved outermost first cam surface 166 that travels along and bears against an outermost surface of a tank 168 (FIG. 4) as the lever body 104 is rotated about the pivot axis 162 towards the adjustable frame 102. Second rocker arm 152 defines a curved outermost second cam surface 167 that travels along and bears against the outermost surface of the tank 168 (FIG. 4).

As the lever body 104 is rotated to the closed position, as seen in FIG. 3, the first cam 154 is received within the first cam receiver 116 of the adjustable frame 102 and the second cam 158 is received within the second cam receiver 118 of the adjustable frame 102.

Figure 4:
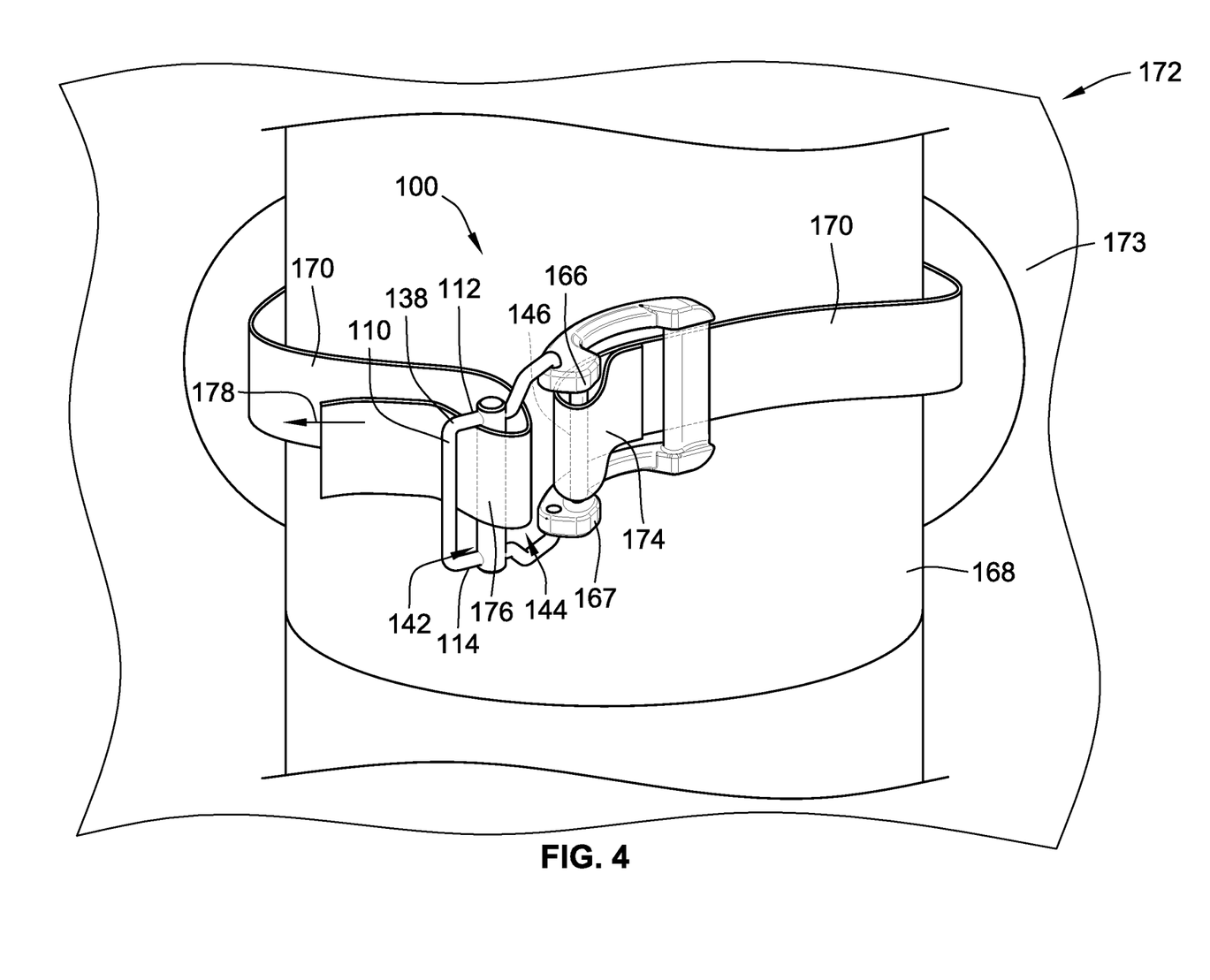
FIG. 4 illustrates a step in securing a tank to a BC with a strap and the tank cinch of FIG. 1.

FIG. 4 illustrates the tank cinch 100 in the open position with a strap 170 of a buoyancy compensation device 172. The buoyancy compensation device includes a buoyancy compensation body 173 that may be a vest or back pack or a buoyancy device utilizing a strap and cinch, as can be appreciated by those familiar with the art. The strap 170 is used to secure, that is tighten so that there is as little movement as possible between the tank 168 and the diver's back. Accordingly, as discussed above, the diver wears the BC and the strap 170 secures the BC to tank 168. In order to secure the tank 168 to the BC a first end portion 174 of the strap 170 is wrapped around strap post 146 and fixed in place. In the embodiment illustrated, the strap is sewn such that one could only remove the strap 170 by breaking the stitches. As can be readily appreciated, other means of fixing the first end portion 174 of the strap 170 in place about the strap post 146 are possible for example by use of rivets or fasteners etc. to name just a few non-limiting examples. By first end portion 174 it is meant an end of the strap 170 and a portion adjacent the end.

With the first end portion of the strap 174 fixed in place at the strap post 146 of the lever body 104, a second end portion 176 surrounds an outermost perimeter of the tank 168 and is passed around the tank 168 and through the second adjustable channel 144. By second end portion 176 it is meant an end of the strap 170 and a portion adjacent the end.

Next, the second end portion 176 of the strap 170 is passed through the first adjustable channel 142 of the adjustable frame 102. By pulling on the second end portion 176 in the direction 178, a first tension force is created along the strap 170 between the first end portion 174 and second end portion 176 that tightens the strap 170 against the tank 168 as the sliding member 138 moves towards the third member 110 of the adjustable frame 102 to pinch or sandwich the strap 170 between the sliding member 138 and the third member 110. As discussed above the first stop 138 acts to limit the travel of sliding member 138 along the first 112 and second 114 straight portions.

Figure 5:
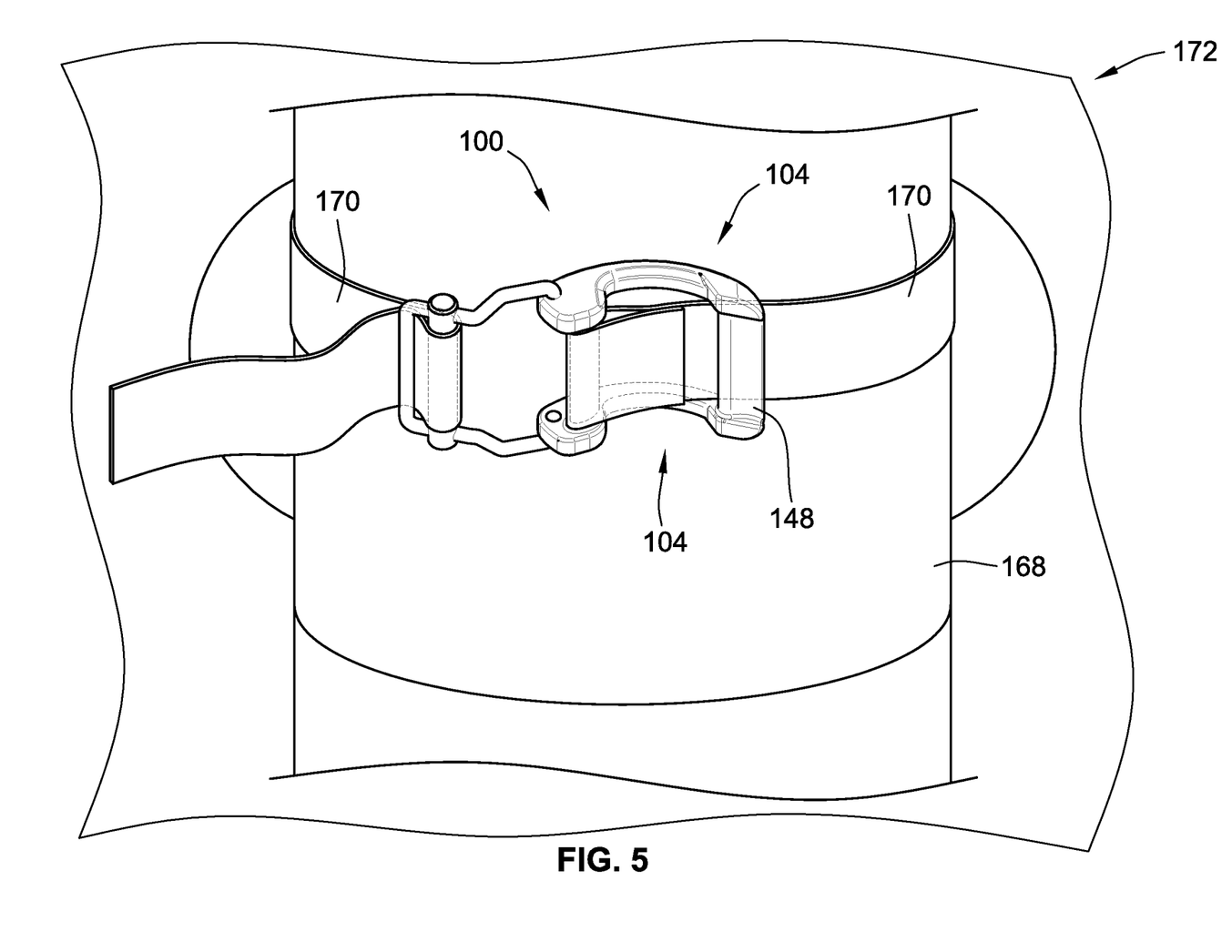
FIG. 5 illustrates a step in securing a tank to the BC with a strap and the tank cinch of FIG. 1.

FIG. 5 illustrates the tank cinch 100 in a fully open position with the strap 170 in a first state of tension to secure the tank 168 against the buoyancy compensation device 172 worn by a diver (not illustrated). As can be readily appreciated, in the open state of FIG. 5, with the tank cinch 100 providing the first state of tension 180 to the strap 170, the strap 170 is not locked into position. In other words, if the lever body 104, for example the handle 148 is bumped or moved, the strap 170 could easily become loose and lose its first state of tension.

Figure 6:
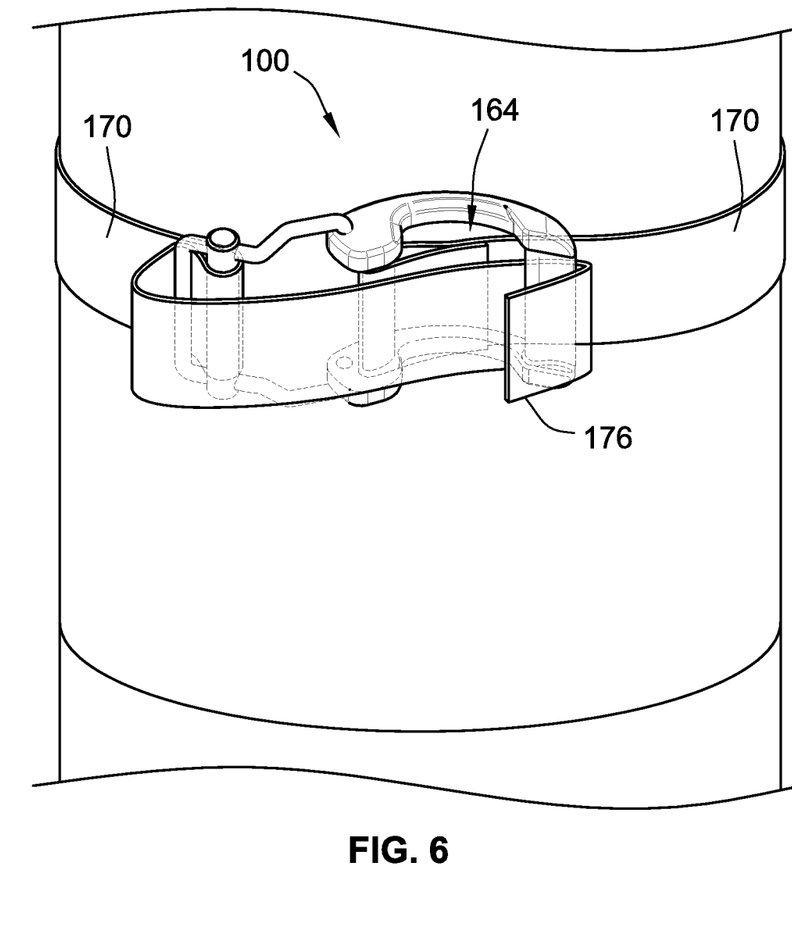
FIG. 6 illustrates another step in securing a tank to the BC with a strap and the tank cinch of FIG. 1.

FIG. 6 illustrates the tank cinch 100 being prepared to transition to the closed (locked) position. To lock the tank cinch 100 into the closed position, the tank cinch 100 must be closed. To close the tank cinch 100, the second end portion 176 of the strap 170 is passed through the lever body channel 164.

Figure 7:
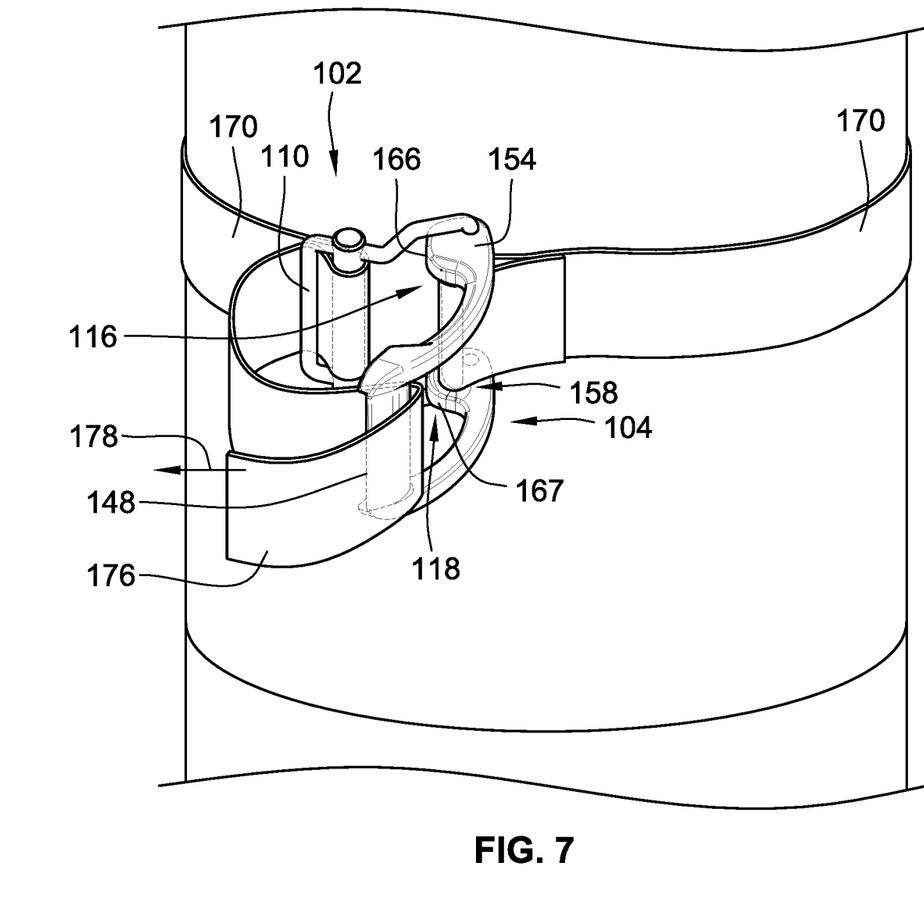
FIG. 7 illustrates another step in securing a tank to the BC with a strap and the tank cinch of FIG. 1.

FIG. 7 illustrates that when the second end portion 176 of strap 170 is pulled around the handle 148, the first cam surface 166 and the second cam surface 167 bear against and roll along an outermost surface of the tank 168 as the handle 148 of the lever body 104 moves towards the third member 110 of the adjustable frame 102. The first cam 154 and the second cam 158 are received into the first cam receiver 116 and the second cam receiver 118 and the handle 148 rests over the third member 110 to sandwich the strap 170 between the tank 168 and the handle 148.

Figure 8:
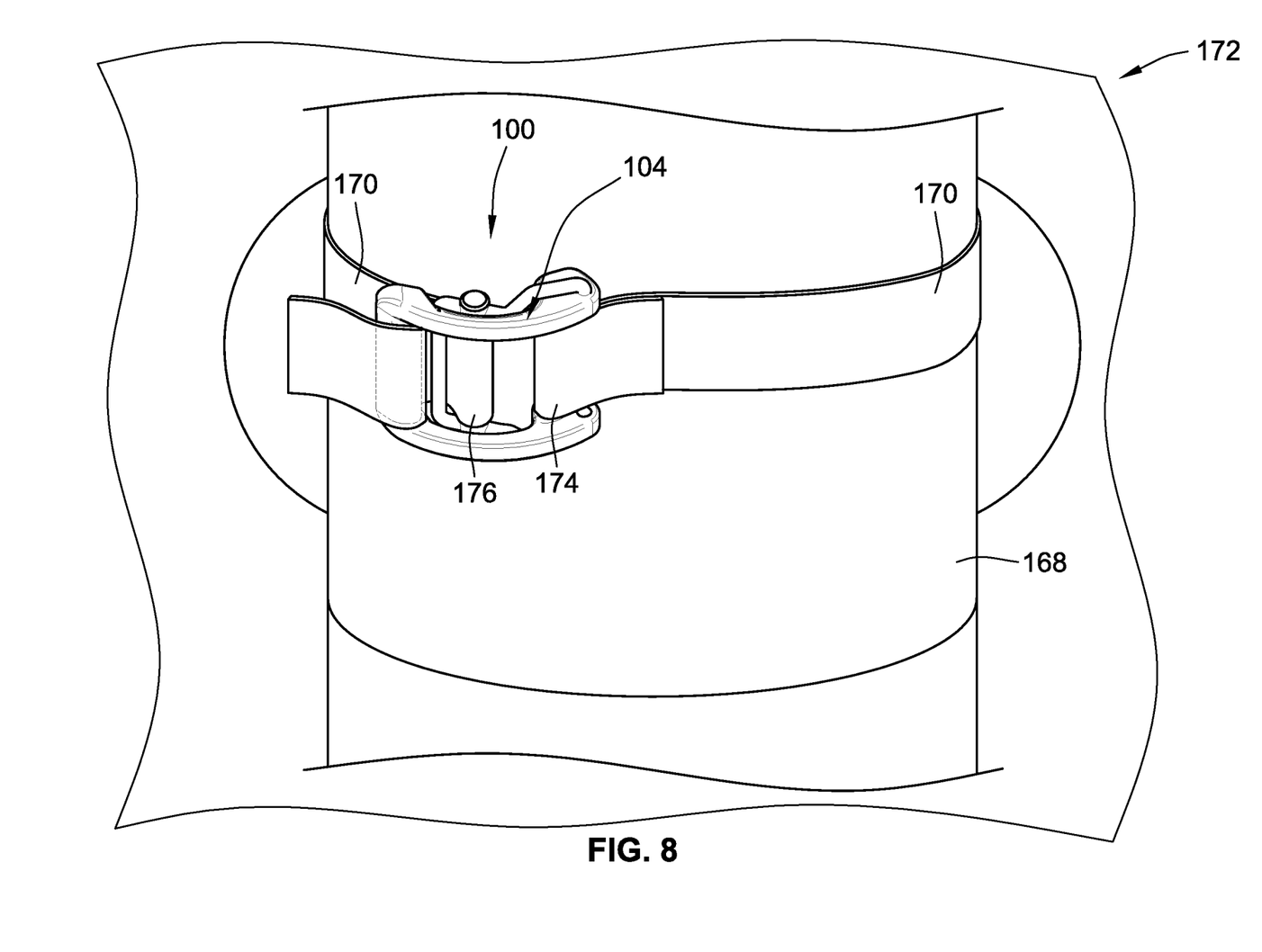
FIG. 8 illustrates the tank cinch of FIG. 1 in the fully closed position to secure the tank to the BC.

FIG. 8 illustrates the tank cinch 100 in a fully closed position. The pulling to rotate the lever body 104 closed generated a second tensioning force, greater than the first tensioning force acting on the first end portion 174 and the second end portion 176 of the belt 170 to lock the strap 170 in place, that is secures the tank 168 to the BC 172 for use by a diver.

As discussed previously, the tank cinch 100 advantageously provides for lower cost in manufacturing because of its simplicity of design. Further the tank cinch 100 is much easier to operate and simpler to understand than cinches previously known. Additionally, because of the simple design and ease of use, securing a tank to a BC can be done in a shorter amount of time which in turn results in more time for a diver to dive.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tank cinch configured to cooperate with a strap to secure a tank of compressed air to a buoyancy compensation device; the tank cinch comprising:
    an adjustable frame having a sliding member, a first cam receiver and a second cam receiver; and
    a lever body pivotably joined to the adjustable frame, the lever body pivotable about a pivoting axis defined by the adjustable frame; the lever body having a first cam and a second cam;
    wherein the lever body is configured to attach to a first end portion of the strap and the adjustable frame is configured to fix a second end portion of the strap with the sliding member when the lever body is rotated about the pivoting axis towards the adjustable frame, and
    wherein the first and second cams are arranged to bear against an outermost surface of the tank and to be received, respectively, in the first and second cam receivers when the lever body is pivoted towards the adjustable frame.

2. The tank cinch of claim 1, wherein the outermost perimeter of the lever body is defined by:
    a handle;
    a fixed strap post; the fixed strap post approximately parallel to and in opposed relation to the handle;
    a first rocker arm connecting the handle and the strap post; and
    a second rocker arm approximately parallel to and in opposed relation to the first rocker arm, the second rocker arm connecting the handle and the strap post.

3. The tank cinch of claim 2, wherein the first rocker arm includes the first cam and the second rocker arm includes the second cam.

4. The tank cinch of claim 3, wherein the first cam and the second cam each define a respective aperture; each respective aperture receiving a respective leg of the adjustable frame.

5. The tank cinch of claim 1, wherein the adjustable frame comprises:
    a first member separated from a second member by a third member transverse to the first and second members; and
    wherein the sliding member defines a first slot and a second slot configured to receive the first member and second member respectively therethrough.

6. The tank cinch of claim 5, wherein the first member defines a first straight portion and the first cam receiver and the second member defines a second straight portion and the second cam receiver.

7. The tank cinch of claim 6, wherein the third member defines a first stop for the sliding member and the first cam receiver and second cam receiver define a second stop for the sliding member.

8. The tank cinch of claim 7, wherein the sliding member slides along the first and second straight portions between the first and second stops.

9. The tank cinch of claim 6, wherein the first cam receiver is defined by a first leg, a second leg and a third leg and the second cam receiver is defined by a second first leg, a second second leg and a second third leg.

10. The tank cinch of claim 9, wherein the third leg and second third leg are received into a first cam aperture and a second cam aperture, respectively, of first and second rocker arms to define the pivoting axis.

11. A tank cinch configured to cooperate with a strap to secure a tank of compressed air to a buoyancy compensation device for a diver; the tank cinch comprising:
    an adjustable frame having a sliding member; an end of the adjustable frame and the sliding member defining a first adjustable channel;
    a lever body, the lever body having a strap post arranged for attaching the lever body to a first end portion of the strap; the lever body pivotably joined to the adjustable frame;
    wherein the sliding member and strap post define a second adjustable channel which is arranged to receive a second end portion of the strap; and
    wherein the lever body defines a first and second cam, the first and second cams received, respectively, into a first cam receiver and a second cam receiver defined by the adjustable frame.

12. The tank cinch of claim 11, wherein the first adjustable channel receives the second end portion of the strap and is configured to provide a first tensioning force to the strap when the second end portion of the strap passes over the sliding member and into the first adjustable channel.

13. The tank cinch of claim 11, wherein a pivoting axis is defined by a second end portion of the adjustable frame.

14. The tank cinch of claim 13, wherein the lever body provides a tensioning force to the strap when the lever body is rotated towards the adjustable frame, the tensioning force locking the lever body into a fixed position.

15. The tank cinch of claim 11, wherein the lever body defines a handle at its outermost perimeter and wherein the strap post is located between the sliding member and the handle.

16. The tank cinch of claim 15, wherein the adjustable frame includes a first member at its outermost perimeter in opposed relation and approximately parallel with the handle and wherein the sliding member is located between the first member and the strap post.

17. A buoyancy compensation device configured to secure a tank of compressed air; the buoyancy compensation device comprising:
    a buoyancy compensation body configured to be worn by a diver;
    a strap arranged to secure the tank of compressed air to the buoyancy compensation body; and
    a tank cinch comprising:
        an adjustable frame having a sliding member;
        a lever body pivotably joined to the adjustable frame, the lever body pivotable about a pivoting axis defined by the adjustable frame;
        wherein the lever body is configured to attach to a first end portion of the strap and the adjustable frame is configured to fix a second end portion of the strap with the sliding member when the lever body is rotated about the pivoting axis towards the adjustable frame, wherein the lever body defines a first and second cam, the first and second cams received, respectively, into a first cam receiver and a second cam receiver defined by the adjustable frame.

18. The buoyancy compensation device of claim 17, wherein the adjustable frame consists of:
    a first member separated from a second member by a third member transverse to the first and second members; and
    wherein the sliding member defines a first slot and a second slot configured to receive the first member and second member respectively therethrough.

19. The buoyancy compensation device of claim 18, wherein the first member defines a first straight portion and a first cam receiver and the second member defines a second straight portion and a second cam receiver.

* * * * *